United States Patent Office 3,244,513
Patented Apr. 5, 1966

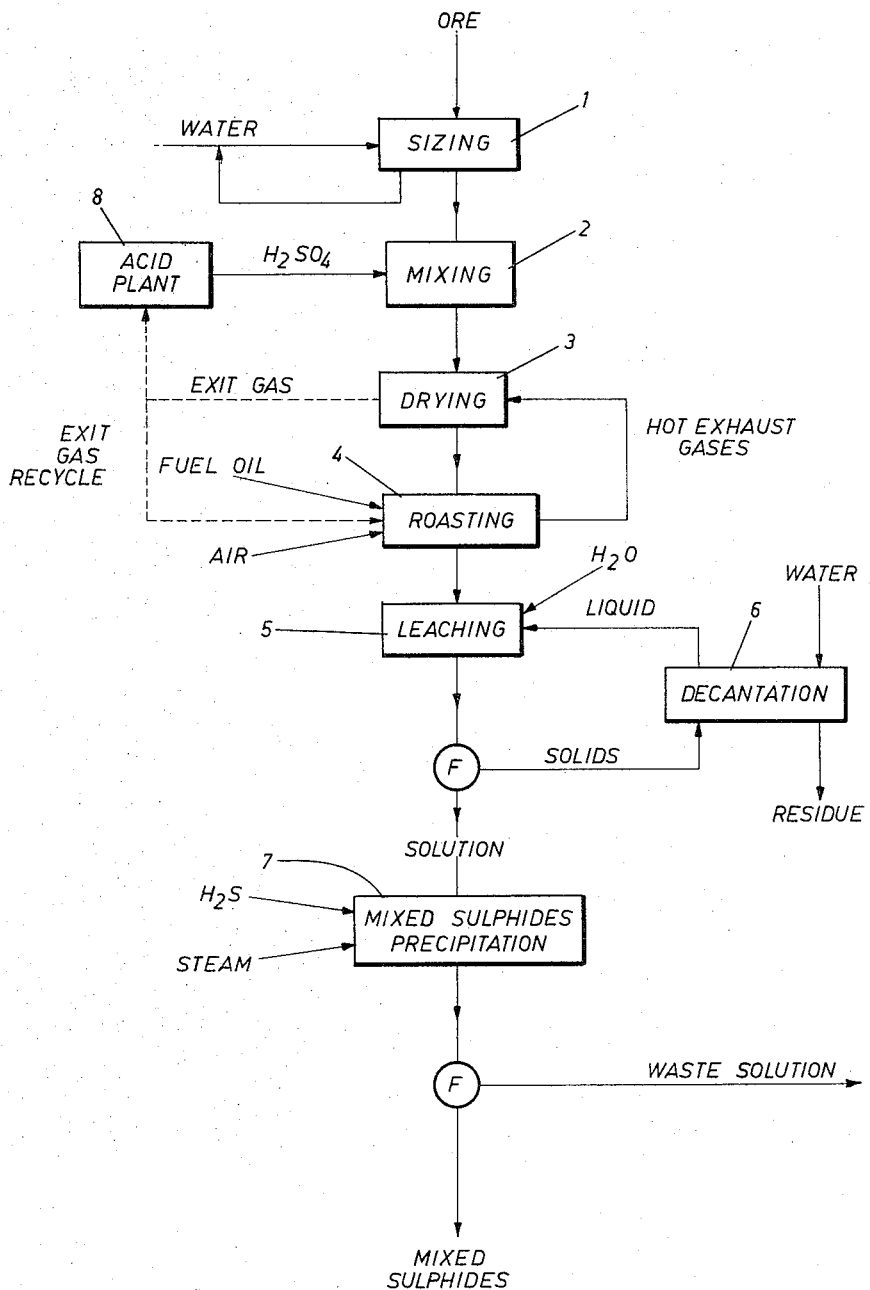

3,244,513
PROCESS FOR THE TREATMENT OF LATERITIC ORES TO OBTAIN COBALT AND NICKEL VALUES
Nicolas Zubryckyj, Ernest Mehl, and Vladimir Nicolaus Mackiw, Fort Saskatchewan, Alberta, Canada, assignors to Sherritt Gordon Mines Limited, Toronto, Ontario, Canada, a company of Canada
Filed Jan. 2, 1963, Ser. No. 248,954
8 Claims. (Cl. 75—119)

This invention relates to the recovery of nickel and/or cobalt values from oxidized ores and concentrates. It is particularly directed to providing an efficient, economic process for the treatment of nickeliferous and/or cobaltiferous lateritic ores of the limonitic type.

The major portion of the world's nickel resources are contained in oxidized ores such as laterites of the limonitic type, garnierite and serpentine. Large deposits of these types of ores have been found in Cuba, the Philippines, New Caledonia, Indonesia, and Central and South America. The laterite deposits in Cuba and New Caledonia constitute important sources of the world's supply of nickel.

There are important economic and operating problems in the treatment of these oxidized ores for the recovery of the contained nickel and cobalt values. Usually, they contain only relatively small amounts of nickel and cobalt, of the order of about 1%, by weight, nickel and about 0.1% cobalt in Cuban and Philippines ores and somewhat higher amounts in New Caledonia ores. They are not responsive to treatment by known processes for the mechanical concentration of the nickel and/or cobalt values. Consequently, it is necessary to treat large amounts of materials metallurgically for the recovery of relatively small amounts of desired nickel and/or cobalt values.

Processes are known and are used for the treatment of lateritic ores of the limonitic type for the recovery of the contained nickel and cobalt values. Such known processes include smelting to produce a ferro-nickel alloy which usually contains cobalt and a ferro-cobalt alloy which usually contains nickel.

A further known process, known as the Caron process, involves subjecting the ore to a reducing roast to convert the contained nickel and cobalt values to crude metallic form; leaching the reduced calcines with an ammoniacal ammonium carbonate solution; precipitating dissolved nickel values from the solution as nickel carbonate; and decomposition of the nickel carbonate to form nickel oxide.

A still further known process involves leaching the lateritic ore under pressure with strong sulphuric acid solution; selectively precipitating the dissolved nickel and cobalt values from the leach solution in the form of sulphides, and thereafter treating the nickel-cobalt sulphides for the separate recovery therefrom of the contained nickel and cobalt as product metals.

Known hydrometallurgical processes for the treatment of nickeliferous lateritic ores of the limonitic type have the advantages that at least part of the nickel and cobalt is recovered from the ores and can be converted to marketable forms. They have the important disadvantages in that they are costly, as compared with the capital and operating costs of producing nickel and cobalt from sulphide ores; the percentage extraction of the nickel and cobalt from the ore is relatively low by modern standards; they require large volumes of relatively costly leaching reagents and precise control over the individual steps of the process; and, in the strong sulphuric acid leaching process, corrosion is an important problem.

We have discovered a relatively simple, ecomonic process for the treatment of nickeliferous lateritic ores of the limonitic type which overcomes the disadvantages of the prior art process and by means of which the nickel and cobalt are converted into soluble form and dissolved in a leach solution with a high degree of extractive efficiency. The nickel and cobalt values dissolved in the leach solution are precipitated to form a high grade sulphide concentrate which can be treated economically by known methods for the recovery of the contained nickel and cobalt as product metals.

The process of this invention can be simply stated. It involves, in general, the steps of:

(a) Mixing finely divided ore particles with sulphuric acid in amounts at least sufficient, and preferably in slight excess of that required, to combine with the nickel, cobalt, manganese and magnesium values as sulphates but less than that required to combine with the iron and the non-ferrous metal values contained in the ore particles;

(b) Heating the partially sulphated ore particles at a temperature below 725° C.;

(c) Continuing the heating step under controlled conditions to obtain substantially complete sulphation of nickel, cobalt and manganese values;

(d) Leaching the sulphated non-ferrous ore particles with water to extract and dissolve the nickel, cobalt and manganese sulphates;

(e) Separating undissolved residue from the leach solution;

(f) Reacting the solution with a sulphidizing agent to convert the dissolved nickel and cobalt values to and precipitate them from the solution as sulphides; and (g) Separating precipitated nickel and cobalt sulphides from the solution.

While the process can be simply stated, there are conditions which must be observed in order to obtain optimum extraction and recovery of the desired nickel and cobalt values from the large amount of ore which must be treated as an economically practical operation.

The lateritic ore amenable to treatment by the process of this invention is described as of the limonitic type. This type of ore normally contains a relatively high percentage of iron, the presence of which is an important factor in the conversion in the heating step of the contained nickel and cobalt values to water soluble sulphates with a minimum amount of acid. We have found that the starting material should contain more than about 25% iron and preferably more than about 35% iron, by weight, in order to obtain optimum extraction and recovery of desired nickel and cobalt values in the leaching step. There is no upper limit on the amount of iron which can be present in the starting material. Lateritic ores which contain more than about 25% iron, by weight, are considered for the purpose of this invention to be of the limonitic types. Known lateritic ores of this type usually contain from about 30% to about 60% iron by weight. Lateritic ores of the garnieritic or serpentine type usually contain from about 5% to about 20% iron by weight. Those lateritic ores which contain less than about 25% iron, by weight, can be blended with ores which contain more than 25% iron and thus form a composite ore, which is considered for the purpose of the present invention as of the limonitic type, which contains more than about 25% iron, by weight.

The amount of sulphuric acid added to the ore particles in the mixing step of the process is based on the amount which is at least sufficient to combine as sulphates, with all nickel, cobalt, manganese and magnesium values contained in the ore and, preferably, a small excess, for example, of the order of from about 5% to about 30%, by weight, excess, depending on the composition of the particular ore subjected to treatment.

The amount of acid required can be readily determined on the basis of the nickel, cobalt, manganese, magnesium and other non-ferrous metals present in the ore. Inasmuch as iron is a major component of the ore and acid is not provided for combination therewith as iron sulphate, the amount of acid provided usually is within the range of from about 5% to about 40% of the total acid requirements for the conversion of all the metals present in the ore, including the iron, to sulphates.

The mixing step can be conducted in a conventional pug mill or blender. It is preferred, in order to obtain thorough mixing of the ore particles and the sulphuric acid, to add the acid to moistened ore which contains, for example, from 30 to 60% water.

The temperature at which the roasting step is conducted is a critical factor in obtaining optimum recovery of desired nickel and cobalt values. We have found that while the roasting step can be conducted at a temperature below about 500° C., sulphation of the nickel, cobalt and manganese values proceeds slowly and extractions of nickel and cobalt values in the leaching step are relatively low even after long periods of heating whereas extraction of iron is relatively high. It is preferred, therefore, to conduct the roasting step above about 500° C.

We have found, also, that at a temperature above about 725° C., nickel and cobalt sulphates tend to decompose rapidly and form metal oxides which are insoluble in the following leaching step, thus resulting in low extractions of desired nickel and cobalt values.

The heating step should be conducted, therefore, at a temperature within the range of 500° C. to about 725° C., and optimum results are obtained within the range of from about 600° C. to about 700° C.

We have found, also, that the time of the heating or roasting step is important. For a given acid addition, optimum sulphation is obtained within a predetermined time period which depends on the heating temperature and the composition of the particular ore subjected to treatment. Thus, it is necessary to control the time of heating at the selected temperature to ensure optimum sulphation of the nickel and cobalt values.

The heating step can be conducted with satisfactory results in an inert atmosphere, a slightly reducing atmosphere, or an oxidizing atmosphere. It is preferred, however, to conduct the heating step in a slightly oxidizing atmosphere, and we have found that maximum utilization of the sulphation agent, sulphuric acid, and optimum sulphation of the nickel, cobalt and manganese values is obtained when, in addition to maintaining oxidizing conditions in the reaction zone, a positive pressure of released gases is maintained in the reaction zone by partially confining the gases in the heating furnace.

The operation of the present process is described in detail hereinafter with reference to the accompanying flow sheet drawing.

The lateritic ore usually is subjected to a preliminary sizing operation in step 1 to separate oversize particles and lumps. Oversize lumps and agglomerates can be separated from smaller sized particles of the charge mixture, such as by coarse screening. The smaller sized particles are then dispersed in water with agitation to form a slurry which contains from 25% to 35% solids. The oversize particles, larger than about 1 mm., can then be separated by passing the slurry over a screen. The solids content of the slurry can then be increased, if desired, such as in a thickener or by the addition of ore particles.

The mixture of water and ore particles, about 45% to about 60% solids, is passed to the mixing step 2 wherein it is mixed with sulphuric acid, preferably in concentrated form.

As stated above, the acid is provided in amount at least sufficient to combine with the nickel, cobalt, manganese and magnesium values as sulphates and, usually, from about 5% to about 40% in excess. The amount of excess acid is dependent on the composition of the ore subjected to treatment and, in particular, is related to the amount of other non-ferrous metal values present in the ore in addition to the nickel, cobalt and manganese. Lateritic ores generally vary considerably in composition, depending on their source and geological history. In particular, the magnesium and aluminum contents vary considerably in different types of ores. For example, the magnesium content may vary between about 0.5% and 10% and the aluminum content between about 1% and 5%. Because of the variations in the compositions of the ores and because the metal values are present in the ores in very complex forms, it is not possible to predict exactly the amount of sulphuric acid which will be required for a specified ore. However, this can be determined quite readily by one skilled in the art from the teachings set out herein. As stated above, however, the minimum is that required to combine as sulphates with the nickel, cobalt, manganese and magnesium contents of the ore. Any additional amount required to obtain optimum results in the heating step can be determined readily. In general, the total acid requirement is within the broad range of from about 10% to about 60% by weight of the ore and, usually is between about 20% to about 30% by weight of the ore.

The mixing step 2 can be conducted in a conventional device such as a blender or pug mill. Mixing is continued to obtain optimum distribution of acid throughout the mixture. Additional water can be added during mixing if required to maintain the paste-like consistency of the mass.

The temperature at which the mixing step is conducted is not critical. We have found that excellent results are obtained when it is conducted at the temperature which is produced autogeneously by the reaction of the ore and acid, usually from about 90° C. to about 140° C.

The acidified mixture can be passed directly to the heating furnace. Alternatively, it can be dried either by permitting it to become dry in the latter stages of the mixing step by omitting the water additions, or by drying it in a conventional drier 3, such as a heated, rotary kiln. The dried material need not be crushed prior to passing it to the heating furnace. However, the most satisfactory results are obtained from the roasting step when the ore particles are in a finely divided state, that is, smaller than about 0.5 cm.

The partially sulphated, dried ore particles are passed to the heating step 4 wherein they are heated at a temperature within the range of from about 500° C. to about 725° C., and, preferably from about 600° C. to about 700° C. The heating step can be conducted in a conventional ore roasting furnace, such as a multiple hearth furnace or a kiln, in which the temperature can be closely controlled. Heat can be supplied by direct combustion of fuel inside the furnace or by external heating.

The time of the heating step depends on the temperature at which it is conducted. That is, the rate of sulphation is increased as the temperature is increased towards the maximum temperature of about 725° C. The heating is continued at the selected temperature until optimum sulphation of the desired non-ferrous metals is obtained. The length of time required to obtain optimum sulphation at any selected temperature within the recommended range is dependent on many factors, such as, for example, the nature of the ore subjected to treatment, the type and size of equipment used, and the amount of excess acid used. However, we have found that, generally speaking, it is desirable to continue the heating for a period of time sufficient to ensure that the amount of water soluble iron in the calcine is less, in terms of weight, than 5 times the water soluble nickel content of the calcine, and preferably, it should be equal to or less than the water soluble nickel content. In other words, the heating step is continued until the weight ratio of iron sulphate to nickel sulphate in the calcine is less than about 5:1 and preferably about 1:1 or less. In most cases optimum sulphation is obtained in from about 1 minute to about 20 minutes at 700° C. or from about 60 minutes to about 120 minutes at 600° C. The heating step can be conducted on a batch or a continuous basis.

An explanation of the reactions which take place in the acid mixing and heating steps is that sulphuric acid combines with part of the iron and part of the non-ferrous metal values in the mixing step to form sulphates. Iron, magnesium, and aluminum sulphates are converted to oxides in the heating step. There is a transfer, during this conversion, of sulphate radicals from the iron sulphate, and to a lesser extent from the aluminum and magnesium sulphates, to the nickel, cobalt, and manganese, to form metal sulphates which are more stable at the heating temperature.

An important feature of this invention is the conduct of the heating step to obtain optimum utilization of the sulphating agent, sulphuric acid, added in the mixing step. Satisfactory sulphation is otbained if the heating is conducted under atmospheric conditions, or if the atmosphere is inert, slightly reducing or oxidizing. Optimum sulphation is obtained, however, by maintaining a slightly oxidizing atmosphere, supplied by a stream of oxygen, oxygen enriched air or air without oxygen enrichment, and either maintaining a partial pressure of gases released during heating in the reaction zone of the order, for example, of up to about 20 pounds per square inch gauge, or withdrawing these gases, which consist mainly of water vapour, small amounts of sulphuric trioxide and sulphur dioxide, and recirculating them to the reaction zone, or a combination of both.

It is believed that the function of the oxygen in the reaction zone is to maintain the iron in the trivalent state during the heating and thus avoid the formation of sulphur dioxide. The amount of free oxygen containing gas supplied is not critical but it should be supplied in a manner such that it does not sweep the off-gases out of the reaction zone. The reactions which take place in situ in the ore mass during heating with respect to the oxygen is believed to be expressed by the following equations:

During roasting, divalent iron sulphate decomposes according to the following reaction:

$$FeSO_4 + \tfrac{1}{2}O_2 \rightarrow Fe_2O_3 + 2SO_3 \quad (1)$$

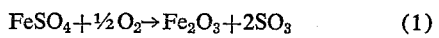

Trivalent iron sulphate decomposes according to Reaction 2:

$$Fe_2(SO_4)_3 \rightarrow Fe_2O_3 + 3SO_3 \quad (2)$$

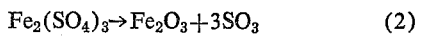

Sulphur trioxide tends to decompose according to Reaction 3:

$$SO_3 \rightleftharpoons SO_2 + \tfrac{1}{2}O_2 \quad (3)$$

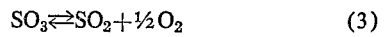

Sulphur dioxide reduces ferric sulphate to ferrous sulphate according to Reaction 4:

$$Fe_2(SO_4)_3 + SO_2 \rightarrow 2FeSO_4 + 2SO_3 \quad (4)$$

Thus, Reactions 1, 2 and 4 release the active sulphating agent, sulphur trioxide, in situ, and the non-ferrous metal values are sulphated very efficiently, and very little sulphur trioxide escapes from the ore mass into the heating atmoshpere. For maximum utilization of the sulphating agent, it is desirable to oxidize a maximum amount of sulphur dioxide, produced according to Equation 3, to sulphur trioxide in accordance with Equation 4. Thus, it is preferred, in order to obtain optimum sulphation results, that sufficient trivalent iron sulphate is available to react with the sulphur dioxide as it is produced. The presence of a free oxygen containing gas in the reaction zone assures that at least the major portion of the iron sulphate remains in the trivalent state by reaction with divalent iron sulphate according to Equation 5:

$$2FeSO_4 + SO_3 + \tfrac{1}{2}O_2 \rightarrow Fe_2(SO_4)_3 \quad (5)$$

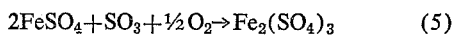

The presence of free oxygen in the reaction zone has the overall effect of shifting the equilibrium of reversible Reaction 3 to the left, thus promoting the formation of sulphur trioxide in situ and suppressing the formation of sulphur dioxide.

There may be agglomeration of sulphated particles in the roasting step. These agglomerates or lumps are easily disintegrated and, accordingly, they can be passed directly to leaching step 5. It is preferred, however, to grind them lightly to sub-divide the agglomerates prior to dispersing them in the leach solution, thus to increase the surface area of the particles exposed to the leach solution.

The sulphated particles are dispersed in water in leaching step 5 to form a slurry which contains, preferably, from about 25% to about 60% solids, by weight. The temperature at which leaching is conducted is not critical. Usually it is conducted below 100° C. to avoid the necessity of conducting it in a pressure vessel, such as within the range of from about 20° C. to 95° C. A satisfactory leaching rate is obtained within the range of from about 50° C. to about 90° C. Under these conditions, over 80% of the nickel, cobalt and manganese, if present, contained in the starting material are extracted and dissolved in the leach solution, along with some of the soluble magnesium and aluminum. Also, a small part of the iron, less than about 10% and usually from about 1% to about 5%, contained in the starting material is dissolved in the leach solution. The leaching rate is rapid and usually is complete within about 30 minutes retention time.

Undissolved residue is separated from the leach solution by a conventional liquid-solids separation, such as filtration. If desired, undissolved residue can be washed with water in a decantation step 6 from which slurry can be discharged from the process and the wash water passed to the leaching step.

The leach solution containing the dissolved nickel and cobalt values is passed to the sulphide precipitation step 7 wherein it is reacted with a sulphidizing agent, such as hydrogen sulphide or other soluble sulphide compounds, mixtures of elemental sulphur and sulphur dioxide, or iron and elemental sulphur, preferably at elevated temperature and pressure, to effect the precipitation of the dissolved nickel and cobalt as sulphides.

In using hydrogen sulphide as the sulphidizing agent in this sulphide precipitation step, optimum results are obtained when the solution has a pH value of from about pH 1 to about pH 3 and it is conducted at a temperature within the range of from about 60° C. to about 150° C. and under a partial pressure of hydrogen sulphide above about 25 pounds per square inch. A nucleation agent, such as in the form of finely divided, previously precipitated metal sulphides, is provided in the solution subjected to treatment to promote the initiation of the sulphidizing reaction.

An important advantage of the present process is that the leach solution from the leaching step autogeneously has a pH value within the range of from about pH 1 to about pH 3.5. Thus, the solution usually requires no preliminary treatment to adjust the pH value to within the range within which optimum results are obtained in the precipitation step. Precipitated nickel and cobalt sulphides are separated from the treated solution, such as by filtration. They are in the form of a high grade sulphide concentrate which can be treated by known methods for the separated recovery of the nickel and cobalt values as product metals.

The filtrate from the sulphide precipitation step can be treated, if desired, for the recovery of any residual dissolved metal values, such as manganese. A portion of this filtrate can also be used, if desired, in place of water in the mixing step to supply a portion of the iron sulphate.

The following examples illustrate the operation of the present process.

EXAMPLE I

A Cuban laterite ore contained, by weight:

| | Percent |
|---|---|
| Ni | 1.24 |
| Al | 1.8 |
| Mn | 0.51 |
| S | 0.03 |
| Co | 0.12 |
| Cr | 1.7 |
| Ca | 0.02 |
| Cl | 0.02 |
| Fe | 43.7 |
| Mg | 1.32 |
| Cu | 0.004 |
| Insol. | 13.8 |
| Ignition loss | 12.4 |

This ore was dried at 110° C. and ground to a particle size smaller than about 150 microns. 100 grams of this dried ore was mixed with a small amount of water to form a thick paste-like slurry. Concentrated sulphuric acid, 30% by weight of the ore, was added. This was much less than the 138 grams of acid that would be required for combination with the iron and all the non-ferrous metal values as sulphates. The mixture of ore and acid was mixed in a pug mill to obtain dispersion of the acid. Water was added as required to maintain the paste-like consistency and prevent solidification. After 1 hour mixing, the mass was heated at 600° C. for 1 hour in an oxidizing atmosphere provided by flow of oxygen through the reaction zone of the 1½ inch diameter furnace of 1.5 litres per minute. The sulphated calcine was then cooled, re-ground to a particle size smaller than about 150 microns, and dispersed in water to form a slurry which contained about 50% solids. The slurry was leached, with agitation for 1 hour at 80° C. At the end of the leaching period, undissolved residue was separated from the leach solution. 225 ml. of solution contained 4.4 g.p.l. (grams per litre) nickel; 0.36 g.p.l. cobalt; 6.5 g.p.l. iron; and 1.6 g.p.l. manganese. The residue, which weighed 791 grams, contained 0.31% nickel; 0.024% cobalt; 50.4% iron; and 0.12% manganese. The recoveries of these metals in the solution were calculated as 80.1% of the nickel; 84.2% of the cobalt; 3.5% of the iron; and 81.5% of the manganese contained in the starting material.

1500 ml. of the leach solution, which had a pH value of 2.0, was charged into a high pressure, glass lined autoclave. 1 gram per litre of finely divided mixed nickel-cobalt sulphides from a previous precipitation was added to the solution as a nucleating agent. The solution in the autoclave was heated to about 105° C. and reacted with hydrogen sulphide under a pressure of about 50 pounds per square inch. 99% of the nickel and cobalt precipitated from the solution in 20 minutes. The precipitate, which had excellent settling and filtering properties, contained, by weight, 58.2% nickel; 4.2% cobalt; 0.46% iron; and 36.6% sulphur.

EXAMPLE 2

Two 500 gram samples of Cuban lateritic ore having the analysis set out in Example 1 were each moistened with 250 ml. of water. Each batch was mixed for 5 minutes with 150 grams of concentrated (100%) sulphuric acid. The paste-like mass was then dried at 110° C. The individual samples of the dried material were crushed to a size smaller than about 20 millimetres and blended together. The 1000 grams of blended particles were charged into a rotary kiln, which was rotated at a speed of 10 revolutions per minute, and were roasted at a temperature of 650° C. for 25 minutes in an oxidizing atmosphere supplied by a stream of air flowing through the furnace at the rate of about 1.5 litres per minute. Upon completion of the roasting step, the roasted material was discharged from the kiln, ground to a particle size smaller than about 150 microns, and leached with 1500 ml. of water for 30 minutes at 80° C. The mixture was agitated during the leaching step. Undissolved residue was separated from the solution by filtration. On analysis of the undissolved residue and the leach solution, it was found that 80% of the nickel, 94.5% of the cobalt, and 8.1% of the iron had been extracted from the starting material and dissolved in the leach solution.

In a further test, a 500 gram sample of the same ore was treated in the same manner with the difference that the roasting temperature was maintained at 700° C. At the end of the test, it was found, on analysis of the residue and the leach solution, that 83.7% of the nickel, 76.7% of the cobalt, and 2.1% of the iron had been extracted from the starting material and dissolved in the leach solution.

EXAMPLE 3

Samples of Philippine limonitic and Philippine serpentine or garnieritic ores were mixed in the ratio of 77 parts limonitic to 23 parts serpentinic. The ores analysed as follows:

| | Philippine ore limonitic | Philippine ore serpentine 1 |
|---|---|---|
| Ni | 1.20 | 1.63 |
| Co | 0.12 | 0.03 |
| Fe | 48.0 | 12.4 |
| Mg | 0.03 | 17.5 |
| Al | 3.5 | 1.3 |
| Cr | 2.3 | 0.87 |
| Mn | 0.84 | 0.19 |
| SiO$_2$ | 2.0 | 32.4 |

Samples of the ore mixture were mixed with 30% and 40% by weight of acid, were heated at 700° C. at atmospheric conditions for various time periods, then leached with water at about 80° C. The results obtained are set out in Table 1.

TABLE I
*Atmospheric roast*

| H$_2$SO$_4$ percent by wt. ore | Heating time, minutes | Extractions percent | | Fe/Ni ratio in solution |
|---|---|---|---|---|
| | | Ni | Co | |
| 30 | ¹0 | 77 | 75 | 1.56:1 |
| | 15 | 82.6 | 83.6 | 1.09:1 |
| | 30 | 80.5 | 85 | 0.95:1 |
| 40 | ¹0 | 79.2 | 87.5 | 4.0:1 |
| | 15 | 82.0 | 91 | 1.95:1 |
| | 30 | 85.5 | 88.0 | 1.57:1 |

¹ Zero time indicates that the sample was heated until it reached the indicated roast temperature (700° C.) when heating was discontinued. Heat up time in each of these cases was 8 minutes.

These results show satisfactory extractions using only 30% acid by weight of ore. Higher amounts of acid result mainly in increased iron extractions. It can be noted that 30% by weight acid is 13% by weight less than that theoretically required to combine with all the non-ferrous metal values in the ore mixture. The calculated amount of acid required to combine with all the non-ferrous metal values is 43.6% by weight of the ore. The amount required to combine with the nickel, cobalt, manganese and magnesium contents is 21.3% by weight; thus the amount of excess acid added in this example was 9.7% by weight of the ore. This example also illustrates that satisfactory results are obtained when an ore containing less than the required iron is mixed with a high iron content ore. Example 3 also illustrates that satisfactory results are obtained when the roast is carried out under atmospheric conditions, that is, no O$_2$ applied from external sources and no pressure maintained.

EXAMPLE 4

This example illustrates the effect of the heating temperature and time on the extraction and dissolution of desired non-ferrous metal values in the water leaching step. Samples of the Cuban lateritic ore treated in Examples 1 and 2 were mixed with 30% by weight, sulphuric acid heated in an oxidizing atmosphere supplied by oxygen flowing through the reaction zone at the rate of 1.5 litres per minute, and leached with water at about 80° C. The results obtained in these tests are set out in Table II below.

TABLE II

| Heating temp. ° C. | Heating time, mins. (excluding warm-up period) | Nickel extraction percent |
|---|---|---|
| 550 | 15 | 55.2 |
| 600 | 15 | 67.4 |
| 650 | 15 | 77.2 |
| 700 | 15 | 82.0 |
| 750 | 15 | 68.8 |
| 800 | 15 | 18.8 |
| 550 | 30 | 64.6 |
| 600 | 30 | 71.2 |
| 650 | 30 | 81.0 |
| 700 | 30 | 81.0 |
| 550 | 60 | 68.4 |
| 600 | 60 | 76.0 |
| 650 | 60 | 82.0 |
| 700 | 60 | 80.0 |
| 550 | 120 | 68.0 |
| 600 | 120 | 75.1 |
| 650 | 120 | 65.5 |

The results obtained in these tests demonstrate that optimum conditions for sulphation of the nickel content of the Cuban ore are at a temperature between about 650° C. and 700° C. with a heating time of from about 15 minutes to about 1 hour. At temperatures below 650° C., equivalent extractions are not obtained even with prolonged roasting. At temperatures above 700° C., the extractions drop sharply after a very short period of roasting.

EXAMPLE 5

In this example, Cuban laterite ore was blended with 30% by weight sulphuric acid for 15 minutes. Samples were charged directly into a closed, externally heated tube taining the total pressure in the furnace at 20 pounds per square inch was applied at the outset and no further oxygen applied during the heating. The temperature was then raised to the desired roasting temperature while maintaining the total pressure in the furnace at 20 pounds per square inch. Heating was continued under these conditions for the desired length of time. The results of this pressure heating are set out in Table III.

TABLE III

| Heating Temperature ° C. | Time, Minutes | Extractions percent | | |
|---|---|---|---|---|
| | | Ni | Co | Fe/Ni |
| 550 | 180 | 81.7 | 85.8 | 4.2 |
| 600 | 30 | 84.7 | 82.0 | 1.8 |
| | 60 | 85.1 | 88.0 | 2.1 |
| | 120 | 88.0 | 82.0 | 2.3 |
| 650 | 30 | 87.9 | 88 | 2.4 |
| | 60 | 82.0 | 88 | 0.85 |
| | 120 | 84.6 | 88 | 1.0 |
| 700 | 15 | 87.2 | 82 | 1.0 |
| | 30 | 82.0 | 81 | 0.7 |
| | 60 | 75.0 | 80 | 0.6 |

These results clearly indicate the improved results that are obtained when the oxygen is present in the reaction zone and the off-gases are confined to the reaction zone under a moderate positive pressure.

EXAMPLE 6

In this example the procedure was the same as that in Example 5 with the exception that no oxygen was applied at the outset nor during the course of the heating. The results are set out in Table IV below.

TABLE IV

| Heating Temperature ° C. | Time, Minutes | Extractions percent | | |
|---|---|---|---|---|
| | | Ni | Co | Fe/Ni |
| 550 | 180 | 62 | 80 | 4 |
| 600 | 30 | 79.4 | 82.3 | 2.8 |
| | 60 | 81.3 | 82.5 | 2.9 |
| | 120 | 81.2 | 79.0 | 2.3 |
| 650 | 30 | 67 | 88 | 2.9 |
| | 60 | 67 | 89 | 1.4 |
| | 120 | 69 | 64 | 0.98 |
| 700 | 15 | 73 | 87 | 1.06 |
| | 30 | 75 | 87 | 0.72 |
| | 60 | 65 | 71 | 0.95 |

These results illustrate that in the absence of oxygen in the heating atmosphere, the extractions of desired non-ferrous values is reduced and iron extraction increased even though the off-gases are confined to the reaction zone under a positive pressure.

EXAMPLE 7

In this example the samples were treated as in Example 5 with the exception that a relatively high flow of oxygen, 5 litres per minute was maintained through the 1½ inch diameter tube furnace; the off-gases were not recycled and the reaction zone was not maintained under pressure. The results are set out in Table V.

TABLE V

| Heating temperature, ° C. | Time, minutes | Extraction Percent | | Fe/Ni Ratio |
|---|---|---|---|---|
| | | Ni | Co | |
| 600 | 30 | 73.8 | 84.7 | 2.0:1 |
| | 60 | 74.8 | 89.7 | 0.82:1 |
| | 120 | 72.0 | 92.4 | |
| 650 | 30 | 72.8 | 89.0 | 1.3 :1 |
| | 60 | 73.3 | 82.5 | 0.51:1 |
| | 120 | 53.5 | 80.0 | 0.32:1 |
| 700 | 15 | 76.5 | 85 | 0.58:1 |
| | 30 | 47.5 | 92 | 0.14:1 |
| | 60 | 27.3 | 63 | 0.012:1 |

The results indicate the reduced extractions of nickel that result when the off-gases are rapidly swept out of the reaction zone by a relatively high flow of free oxygen containing a gas.

*Example 8*

The following example illustrates the effect of increased acid additions.

Cuban limonitic ore was blended with varying amounts of acid for 15 minutes, dried and ground to a particle size smaller than about 150 microns. The ground, partially sulphated ore was then heated for 1 hour at 650° C. in an oxidizing atmosphere provided by a stream of air flowing at the rate of 1.5 litres per minute. The sulphated ore was leached in water and the leach solution analyzed. The results are shown in Table VI.

Table VI

| $H_2SO_4$ by wt. of ore, percent | Solution Analysis, (g.p.l.) | | | Iron/nickel ratio in solution | Extraction percent | | |
|---|---|---|---|---|---|---|---|
| | Ni | Co | Fe | | Ni | Co | Fe |
| 30 | 5.0 | 0.36 | 4.7 | 0.94:1 | 82.0 | 84.2 | 3.5 |
| 40 | 6.59 | 0.56 | 15.0 | 2.28:1 | 84.6 | 89.5 | 5.5 |
| 45 | 6.54 | 0.54 | 28.2 | 4.3 :1 | 86.5 | 90.5 | 11.0 |
| 50 | 6.49 | 0.54 | 53.4 | 8.2 :1 | 86.5 | 92 | 12.5 |

These results illustrate that although extractions of nickel and cobalt increase slightly with increased acid addition, the increase in iron extraction is proportionally much greater. Any advantage gained in the increased nickel and cobalt extraction is overcome by the disadvantages of increased acid consumption and iron contamination in the leach solution. It is preferred to maintain the iron to nickel ratio of the leach solution below at least 5:1 and preferably below 1:1 in order to minimize the iron contamination in the final nickel weight-cobalt sulphide precipitate. This is done by using a minimum amount of acid and conducting the heating step for a sufficient period of time to give a final water soluble iron to nickel weight ratio of below at least 5:1.

The improved process of this invention for the recovery of non-ferrous metal values from nickel bearing lateritic ores of the limonitic type possesses a number of important advantages. The overall process is relatively simple; it involves the use of a minimum amount of sulphuric acid without the need for costly and complex acid recovery circuits; no corrosion problem is encountered; the acid mixing step and the water leaching steps are conducted at relatively low temperatures; the heating step is conducted in conventional apparatus; the only high pressure equipment required is that for the hydrogen sulphide precipitation step; and the reagents used in the process are inexpensive and are readily available.

It will be understood, of course, that modifications of the preferred embodiment of the invention described and illustrated herein can be made without departing from the scope of the invention defined by the appended claims.

What we claim as new and desire to protect by Letters Patent of the United States is:

1. A process for the treatment of a nickel bearing oxidized ore which contains nickel, cobalt, at least about 25% iron by weight and at least one other metal selected from the group consisting of magnesium, manganese, aluminum and chromium which comprises the steps of:
    (a) dispersing said nickel bearing ore particles in water to form a slurry;
    (b) mixing sulphuric acid with said slurry in amount at least sufficient to combine with the contained nickel, cobalt, manganese and magnesium values but less than that required to combine with all the contained ferrous and nonferrous metal values as sulphates;
    (c) heating the sulphuric acid treated ore particles in an oxidizing atmosphere at a temperature within the range of from about 600° C. to about 700° C.;
    (d) continuing the heating step until the weight ratio of water soluble iron to water soluble nickel contained in the ore particles is in the range of 5:1 to 1:1;
    (e) leaching the ore particles from the heating step with water to extract and dissolve nickel and cobalt values;
    (f) separating undissolved residue from the leach solution;
    (g) reacting the leach solution with a sulphidizing agent to convert dissolved nickel and cobalt values to and precipitate them from the solution as sulphides; and
    (h) separating precipitated nickel and cobalt sulphides from the solution.

2. A process for the treatment of oxidized ores which contain nickel, cobalt, at least about 25% by weight iron and at least one other metal selected from the group consisting of magnesium and manganese which comprises the steps of:
    (a) mixing particles of said ore with sulphuric acid provided in amount at least sufficient to combine with the contained nickel, cobalt, manganese and magnesium values as sulphates but less than that required to combine with all the contained metal values as sulphates;
    (b) heating the resulting acid-ore mixture in a reaction zone at a temperature within the range of from about 500 to about 725° C. for a time sufficient to effect a transfer of sulphate radicals from the iron sulphate formed in the acid mixing step to the nickel and cobalt values contained in said mixture and to form a product containing sulphated nickel and cobalt values and iron oxide;
    (c) leaching the product from the heating step with water to extract nickel and cobalt values therefrom;
    (d) separating the leach solution from undissolved residue;
    (e) reacting the leach solution with a sulphidizing agent to precipitate nickel and cobalt values therefrom as sulphides; and
    (f) separating precipitated nickel and cobalt sulphides from the solution.

3. The process according to claim 2 in which the heating step is conducted at above atmospheric pressure in an atmosphere containing free oxygen.

4. The process according to claim 3 in which gases produced in the heating step are continuously withdrawn and re-cycled to the reaction zone.

5. The process according to claim 2 in which sulphuric acid is provided in the acid mixing step in amount within the range of about 10% to about 60% by weight of the ore.

6. The process according to claim 5 in which the heating step is continued until the weight ratio of iron sulphate to nickel sulphate contained in the product of said heating step is within the range of from about 5:1 to about 1:1.

7. A process for the treatment of lateritic ores which contains nickel, cobalt, at least about 25% by weight iron and at least one other metal selected from the group consisting of magnesium and manganese which comprises the steps of:
    (a) mixing particles of said ore with sulphuric acid provided in amount at least sufficient to combine with the contained nickel, cobalt, manganese and magnesium values as sulphates but less than that required to combine with all the contained metal values as sulphates;
    (b) drying the resulting acid-ore mixture;
    (c) comminuting the dried mixture to a particle size smaller than about 0.5 cm.;
    (d) heating the comminuted particles at a temperature within the range of from about 500 to about 725° C. for a time sufficient to effect a transfer of sulphate radicals from the iron sulphate formed in the acid-mixing step to nickel and cobalt values contained in said particles, forming a product containing sulphated nickel and cobalt values and iron oxide;

(e) leaching the product from the heating step in an aqueous solution to extract and dissolve nickel and cobalt values;
(f) separating the leach solution from undissolved residue;
(g) reacting the leach solution with a sulphidizing agent to precipitate nickel and cobalt values therefrom as sulphides; and
(h) separating precipitated nickel and cobalt sulphides from the solution.

8. The process according to claim 7 in which sulphuric acid is provided in the acid mixing step in amount within the range of from about 20% to about 30% by weight of the ore.

References Cited by the Examiner
UNITED STATES PATENTS

| | | | |
|---|---|---|---|
| 1,590,525 | 6/1926 | Kichline | 75—119 |
| 2,197,185 | 4/1940 | Kissock | 75—119 |
| 2,831,751 | 4/1958 | Birner | 75—108 |
| 2,872,306 | 2/1959 | Morrow | 75—101 |
| 3,093,559 | 6/1963 | White et al. | 75—119 X |

DAVID L. RECK, *Primary Examiner.*

BENJAMIN HENKIN, *Examiner.*